(No Model.)
J. L. POPE.
AUTOMATIC LOCK JOINT FOR RAILWAY RAILS.
No. 395,918. Patented Jan. 8, 1889.
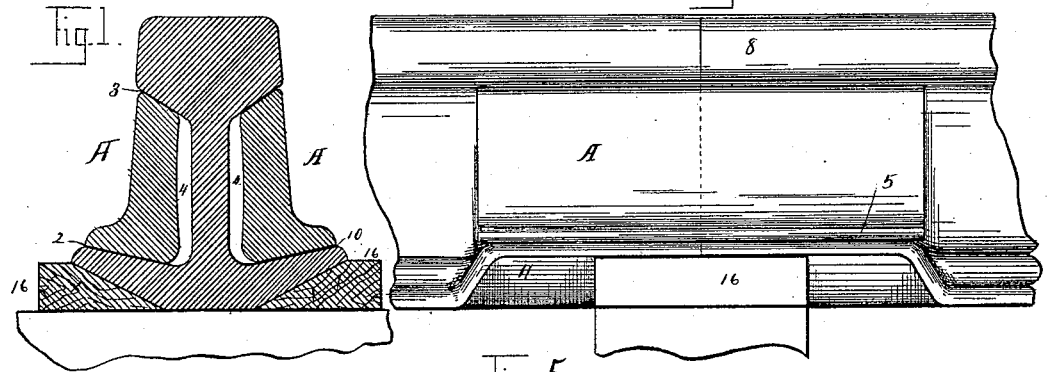
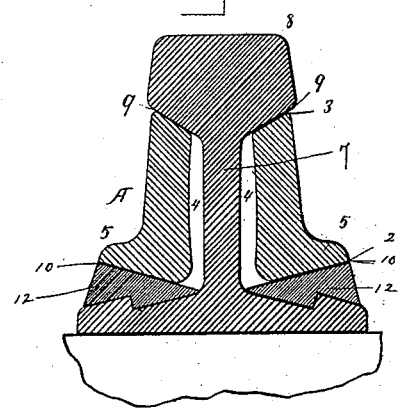
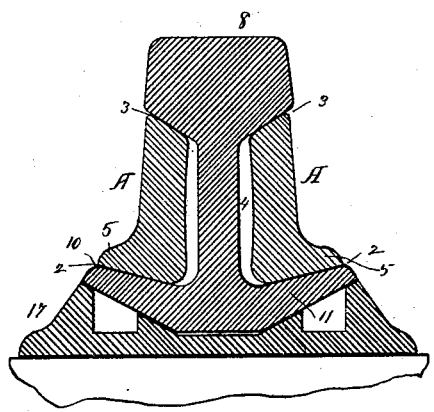
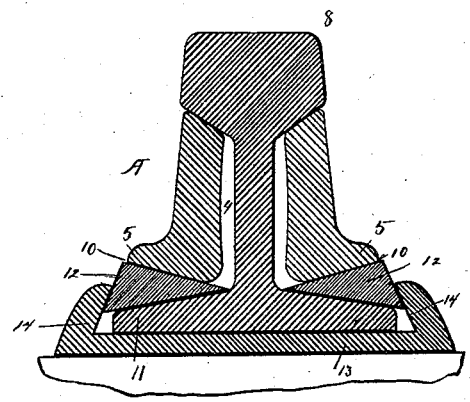
Witnesses:
C. B. Nash.
J. L. Corey.
Inventor:
John L. Pope.
H. P. Fisher.
Attorney.

UNITED STATES PATENT OFFICE.

JOHN L. POPE, OF CLEVELAND, OHIO.

AUTOMATIC LOCK-JOINT FOR RAILWAY-RAILS.

SPECIFICATION forming part of Letters Patent No. 395,918, dated January 8, 1889.

Application filed April 17, 1888. Serial No. 270,962. (No model.)

*To all whom it may concern:*

Be it known that I, JOHN L. POPE, a citizen of the United States, residing at Cleveland, in the county of Cuyahoga and State of Ohio, have invented certain new and useful Improvements in an Automatic Lock-Joint for Railway-Rails; and I do hereby declare that the following is a full, clear, and exact description of the invention, which will enable others skilled in the art to which it appertains to make and use the same.

My invention consists in an automatic lock-joint for railway-rails, the fish-plates of which are so constructed and applied that they will automatically adjust themselves to their position, wedging themselves between their upper and lower bearings, and so that any pressure either vertical or lateral will tend to produce greater tightness, and the greater the pressure the greater this tendency, the construction and operation being such that a constant and efficient contact of the parts is insured and automatic compensation for wear is afforded, all as hereinafter more particularly described.

In the fish-plates hitherto known and employed in this art, so far as I am aware, the construction of the plates and their connection with the rails have been such that when under pressure their tendency was to work away from their bearings upon the rails, not toward them, and thus the plates were made to depend for their efficiency upon some securing mechanism. In fact this mechanism, whether bolts, wedges, or other means, has been the main reliance in all fish-plate connections, and if this gave way the plates likewise gave way and the joint was correspondingly impaired or wholly destroyed.

To illustrate what has been said, take the fish-plate in common use as an example. This plate is so made that when in working position one edge rests against the head of the rail and the other upon the downwardly and outwardly inclined foot or base. As long as the bolts by which it is secured through the web are perfectly tight its upper and lower bearings are of service in strengthening the joint, because it is held in close contact with the head and foot of the rail, and thus any vertical strain—such as is produced by a passing train—is brought directly upon the plate; but as soon as the bolts from any cause work loose the plate also is loosened, and, as this operates to release the plate from its bearings, the joint as a consequence is injured or destroyed. It will be seen also that the joint thus constructed affords no protection against lateral strain, except such as resides in the bolts by which the plates are secured, the bearings of the plates along their respective edges being on outwardly-flaring surfaces and not in any sense constructed or capable of operating so as to strengthen the joint against lateral pressure independent of the bolts.

I am aware that other devices not possessing either the simplicity or the utility of fish-plates have been made with a view to overcoming the objections here enumerated; but I am not aware that the objections have been overcome by any of those devices or that a fish-plate joint has heretofore been known which possesses the advantages of construction or is capable of performing the functions and service claimed for my invention.

In the accompanying drawings, Figure 1 shows a cross-section of my preferred form of joint, illustrated in side elevation in Fig. 2. Figs. 3, 4, and 5 show slight modifications in certain details of construction, which are hereinafter more particularly described.

A represents a form of fish-plate constructed according to the principle of my invention and common to all the forms of adaptation and use illustrated in the several figures. The distinguishing peculiarity of this plate, as already stated in a general way, and in which the invention may be said mainly to reside, is that it is so formed that when in position it locks itself without any securing mechanism.

Specifically described, the plate A is formed with plain straight bearing-surfaces 2 3 along its respective edges at differing angles to the plane of its inner surface, 4, and to the web of the rail, so as to enable it to lock and secure itself upon its bearings, as hereinbefore referred to—that is to say, the surface or bearing 2 is at an acute angle to the plane of the inner surface, 4, and the web, while the surface or bearing 3 is at an obtuse angle thereto, and these angles converge toward the web of the rail. Obviously if both bearings 2 3 were to run in parallel lines the self-locking effect that is desired would be lost.

The bearing 3 along the upper edge of the plate has been described as plain and straight; but this form need not necessarily be observed, as the same result would be obtained with a more or less rounded bearing, but the form shown is preferred on account of wear. The plate A is further formed with a heel or outwardly-projecting flange, 5, along its lower edge, over which the bearing-surface 2 is extended, and whereby said surface is carried out laterally some distance beyond the bearings 3 at the upper edge—say in about the proportion shown—and a bracing and sustaining effect is obtained, which tends to hold the upper edge of the plate in working contact and to lock and brace the plate in its seat.

The seat of the plate A is at the side of the rail, and may be formed in a variety of ways so far as the lower portion thereof is concerned, as will appear from the drawings. A common principle, however, prevails in all the forms shown or that might be suggested, which is that the seating-surfaces should incline inwardly and downwardly toward the web 7 of the rail at differing angles to the plane of the web and at angles corresponding to the bearing-surfaces of the connecting-plate. The head of the rail 8 is therefore formed with a plain straight inwardly and downwardly inclined surface, 9, forming the upper part of the seat for the plate, while the surface 10, with less inclination, is formed for the lower portion of the seat in the manner shown—that is to say, in Figs. 1, 2, and 3 I show a portion of the foot 11 of the rail turned up so that its upper surface will be brought to the proper angle to form the lower portion of the seat for the plate. This foot as usually constructed has the advantage also of having sufficient width to give the necessary breadth of seating-surface to the plate without being further enlarged.

In Fig. 4 I show a rail with the usual foot unchanged and the seating-surface 10 formed by a wedge-shaped metallic plate, 12, laid upon the foot and held in position by a chair, 13, having inwardly-inclined flanges 14, bearing against the inclined outer surface of the plate 12.

In Fig. 5 the metallic plate 12 is shown as connected by a scarf-joint with the foot of the rail. In Figs. 1 and 2 a wooden piece, 16, beveled upon one side, supports the foot of the rail upon the cross-tie, while in Fig. 3 a metallic chair, 17, serves the same purpose.

It is obvious that various other ways of forming an abutment for the plate A might be suggested; but it is thought that a sufficient number have been given to show that there is a wide range of selection within the scope of the invention. The simplest and best method, however, of forming the abutment is represented in Figs. 1, 2, and 3, where the foot of the rail is shown as bent upward to the required angle, and suitable supports are interposed between the foot and the cross-tie.

The operation or action of the plate A after being placed in position in its seat will be understood from the foregoing description. It will be seen that on account of the downward and inward inclination of the lower edge of the plate and its bearing the plate tends to move toward the web of the rail; but the top and bottom cannot both move in that direction, because their bearings converge inward, while the outward projection of the base of the plate will not permit the plate to twist, (i. e., the bottom to move in and the top out,) so that the plate is cramped, wedging itself between its upper and lower bearings. There is thus a constant tendency of the plate to move inward, a constant force exerted to prevent its doing so, and therefore a constant tightness of the joint.

It will be seen that when the plates are in working position they are still somewhat removed from the web with a remaining surface on which to tighten, and that their position and construction are such that they cannot fail to give great strength and firmness to the joint.

If necessary to prevent mischievously-disposed persons from removing the plate without tools, the plate may be held in position by driving a spike into the cross-tie with its head bearing upon the heel of the plate, or by any other simple and sufficient means that may suggest themselves. It will be found, however, that the plates will become so firmly locked that it will require no inconsiderable effort to remove them.

Having thus described my invention, what I claim as new, and desire to secure by Letters Patent, is—

1. In a rail-joint, the fish-plates and rails having their surfaces of contact inclined downward and converged toward the web of the rail, substantially as set forth.

2. In a rail-joint, a fish-plate having bearings along its edges converging inwardly and downwardly in straight lines, substantially as set forth.

3. In a rail-joint, a fish-plate having its lower edge provided with a bearing-surface at an acute angle and its upper edge with a bearing-surface at an obtuse angle to the plane of the web of the rail, and an inwardly-converging seat for the plate, substantially as set forth.

4. In a rail-joint, a fish-plate having bearings on its respective edges at differing angles to the plane of its sides and converging inwardly and downwardly, the lower bearing-surface having greater width than the upper, in combination with a converging seat in which the plate gravitates to a locking position, substantially as set forth.

5. In a rail-joint, a fish-plate having its lower edge re-enforced by a projection extending laterally outward therefrom and provided with a plain bearing-surface the full width of said edge and a plain bearing-surface along the upper edge of the plate, in combination with a seat for the plate at the side of the rail formed on lines converging inward and downward toward the web, substantially as set forth.

6. In a rail-joint, a rail having a bearing on its foot at an acute angle to the web and a bearing on its head at an obtuse angle to the web, substantially as set forth.

7. In a rail-joint, a rail having its foot turned up so as to bring the upper surface thereof to an acute angle to the web and a bearing on the head at an obtuse angle to the web, substantially as set forth.

JOHN L. POPE.

Witnesses:
H. T. FISHER,
J. L. COREY.